US009788315B2

(12) United States Patent
Yu et al.

(10) Patent No.: US 9,788,315 B2
(45) Date of Patent: *Oct. 10, 2017

(54) METHOD AND APPARATUS FOR ALLOCATING RESOURCE OF MULTIPLE CARRIERS IN OFDMA SYSTEM

(71) Applicant: Samsung Electronics Co., Ltd., Gyeonggi-do (KR)

(72) Inventors: Jae Chon Yu, Gyeonggi-do (KR); Jin Kyu Han, Seoul (KR); Youn H. Heo, Gyeonggi-do (KR); Joon Young Cho, Gyeonggi-do (KR); Ju Ho Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/075,990

(22) Filed: Mar. 21, 2016

(65) Prior Publication Data
US 2016/0212736 A1 Jul. 21, 2016

Related U.S. Application Data

(63) Continuation of application No. 13/056,864, filed as application No. PCT/KR2009/004263 on Jul. 30, 2009, now Pat. No. 9,294,257.

(30) Foreign Application Priority Data

Jul. 31, 2008 (KR) .................. 10-2008-0074918

(51) Int. Cl.
H04W 72/04 (2009.01)
H04L 5/00 (2006.01)
(52) U.S. Cl.
CPC .......... H04W 72/042 (2013.01); H04L 5/001 (2013.01); H04L 5/0007 (2013.01); H04L 5/0094 (2013.01); H04L 5/0053 (2013.01)

(58) Field of Classification Search
CPC ..... H04L 5/0094; H04L 5/001; H04L 5/0001; H04L 5/0003; H04L 5/0005; H04L 5/0007; H04L 5/0053; H04W 72/042
(Continued)

(56) References Cited

U.S. PATENT DOCUMENTS 6,477,157 B1    11/2002  Kim et al.
2007/0286064 A1 12/2007  Yu et al.
(Continued)

FOREIGN PATENT DOCUMENTS

EP      1901496       3/2008
JP      2010-515332   5/2010
(Continued)

OTHER PUBLICATIONS

PCT/ISA/237 Written Opinion issued on PCT/KR2009/004263 (5 pp.).
(Continued)

Primary Examiner — Kan Yuen
Assistant Examiner — Richard Chang
(74) Attorney, Agent, or Firm — The Farrell Law Firm, P.C.

(57) ABSTRACT

Provided is a Physical Downlink Control Channel (PDCCH) transmission method of a base station for a mobile communication system based on an Orthogonal Frequency Division Multiple Access (OFDMA). The method includes acquiring downlink control information of a resource corresponding to a carrier among a plurality of carriers, identifying at least one Control Channel Element (CCE) index based on an indicator of the carrier among the plurality of carriers, generating a PDCCH for the downlink control information based on the identified CCE index, and transmitting the PDCCH through a predetermined carrier.

20 Claims, 13 Drawing Sheets

(58) Field of Classification Search
USPC .......................................................... 370/329
See application file for complete search history.

(56) References Cited

U.S. PATENT DOCUMENTS

| | | |
|---|---|---|
| 2007/0291651 A1 | 12/2007 | Hwang et al. |
| 2008/0084853 A1 | 4/2008 | Kuchibhotla et al. |
| 2008/0085718 A1 | 4/2008 | Kuchibhotla et al. |
| 2008/0175195 A1 | 7/2008 | Cho et al. |
| 2008/0232307 A1 | 9/2008 | Pi et al. |
| 2008/0316957 A1 | 12/2008 | Shen et al. |
| 2010/0061345 A1 | 3/2010 | Wengerter et al. |
| 2010/0118800 A1 | 5/2010 | Kim et al. |
| 2010/0182968 A1 | 7/2010 | Ojala et al. |
| 2010/0238870 A1 | 9/2010 | Mitra et al. |
| 2011/0071067 A1 | 3/2011 | Reinhardt et al. |
| 2011/0141941 A1 | 6/2011 | Lee et al. |
| 2011/0164585 A1 | 7/2011 | Yu et al. |
| 2011/0195719 A1 | 8/2011 | Chmiel et al. |
| 2011/0299513 A1 | 12/2011 | Suzuki et al. |
| 2013/0088972 A1 | 4/2013 | Kim et al. |
| 2014/0050186 A1 | 2/2014 | Kim et al. |

FOREIGN PATENT DOCUMENTS

| | | |
|---|---|---|
| JP | 2011-521027 | 7/2011 |
| JP | 2011-529661 | 12/2011 |
| JP | 2012-503893 | 2/2012 |
| JP | 2012-135057 | 7/2012 |
| JP | 2013-534088 | 8/2013 |
| JP | 2013-236340 | 11/2013 |
| JP | 2014-517586 | 7/2014 |
| RU | 2221351 | 1/2004 |
| WO | WO 2008/083804 | 7/2008 |
| WO | WO 2008/085000 | 7/2008 |
| WO | WO 2010/013959 | 2/2010 |

OTHER PUBLICATIONS

PCT/ISA/210 Search Report issued on PCT/KR2009/004263 (3 pp.).
Ericsson, "Carrier Aggregation in LTE-Advanced", R1-082468, TSG-RAN WG1 #53bis, Jul. 4, 2008.
LG Electronics, "CCE to Bundled ACK/NACK PUCCH Index Mapping for TDD", R1-082446, 3GPP TSG RAN WG1 #53bis, Jul. 4, 2008.
Japanese Office Action dated Oct. 21, 2014 issued in counterpart application No. 2014-025720.
Ericsson, "PDCCH Coverage in Narrow Bandwidths", R1-082259, 3GPP TSG-RAN Meeting #53, May 5-9, 2008, 14 pages.
Samsung, "UE-Specific Search Space", R1-081212, 3GPP TSG RAN WG1 Meeting #52bis, Mar. 31-Apr. 4, 2008, 7 pages.
European Search Report dated Sep. 17, 2015 issued in counterpart application No. 09803165.1-1860, 6 pages.
KDDI, NTT DoCoMo, "Multiplexing of PDCCHs of Multiple UEs in E-UTRA Downlink", R1-074755, 3GPP TSG RAN WG1 Meeting #51, Nov. 5-9, 2007, 3 pages.
Korean Office Action dated May 10, 2016 issued in counterpart application No. 10-2009-0070612, 4 pages.

US 9,788,315 B2

METHOD AND APPARATUS FOR ALLOCATING RESOURCE OF MULTIPLE CARRIERS IN OFDMA SYSTEM

PRIORITY

This application is a Continuation of U.S. application Ser. No. 13/056,864, which was filed in the U.S. Patent and Trademark Office on Jan. 31, 2011, as a U.S. National Stage of International Application PCT/KR2009/004263, filed Jul. 30, 2009, and claims priority to Korean Patent Application No. 10-2008-0074918, which was filed in the Korean Patent Office on Jul. 31, 2008, the content of each of which is hereby incorporated by reference.

BACKGROUND OF THE INVENTION

1. Field of the Invention

The present invention relates to a resource allocation method and apparatus for an Orthogonal Frequency Division Multiple Access (OFDMA) system and, in particular, to a resource allocation method and apparatus for an OFDMA-based mobile communication system that allows allocating resources of multiple carriers.

2. Description of the Related Art

Recently, Orthogonal Frequency Division Multiplexing (OFDM) is becoming very popular for modern broadband wireless communication systems and the 3rd Generation Long Term Evolution (3GPP LTE) has adopted OFDM. LTE defines a Physical Downlink Control Channel (PDCCH), which conveys UE-specific control information including downlink resource allocation, uplink resource allocation, and broadcast control channel LTE Advanced (LTE-A) is a major enhancement of 3GPP LTE to meet target data rates of 1 Gbits for high mobility and 100 Mbits low mobility with very high spectrum allocation of 100 MHz by aggregating multiple 20 MHz LTE bands. With the increase of system bandwidth, it is plotted to evolve to 5 LTE-A systems while maintaining use of 20 MHz LTE bands.

The downlink resource allocations of the conventional LTE and LTE-A are described with reference to FIGS. 1 and 2.

An LTE-A system can be implemented by aggregating 4 LTE systems using the LTE bands. Referring to FIG. 1, in the LTE system using the first frequency band f 1, a sub-frame is composed of 14 OFDM symbols of which up to three can be used for control channels. In FIG. 1, three OFDM symbols are used for the control channels exemplarily. Here, a Physical Downlink Control Channel (PDCCH) can be encoded at different coding rates (CRs) depending on the channel condition and transmitted on 1, 2, 4, or 8 Control Channel Elements (CCEs), where a CCE corresponds to 9 Resource Element Groups (REGs) and an REG corresponds to 4 OFDM subcarriers. FIG. 1 shows an exemplary case in which the PDCCH is transmitted on two CCEs for allocating downlink resource. A base station informs a user equipment of the downlink resource with the resource allocation information within the PDCCH. In case of LTE-A system, the base station allocates downlink resources to the UE for the respective frequency bands (i.e. f1, f2, f3, and f4) using individual PDCCHs. For instance, the PDCCH of f1 is used for allocating traffic channel resource for f1, and the PDCCH of f2 is used for allocating traffic channel resource for f2. The LTE-A system depicted in FIG. 1 is implemented for use of wider frequency band while reusing all the functionalities of LTE system. Here, the downlink resource allocation by transmitting the PDCCH on two 2 CCEs is depicted as an example, but in can be applied for uplink resource allocation and resource allocation using a MIMO function.

FIG. 2 shows an exemplary downlink resource allocation technique in which the downlink resources for the entire system frequency band including f1, f2, f3, and f4 are allocated using a single PDCCH in frequency band f4. In the system of FIG. 2, a PDCCH of a frequency band includes additional information on the other bands for the UE to discriminate the downlink resources allocated in different frequency bands.

Although it is advantageous to allocate the resources of frequency bands of different LTE systems using a single frequency band, the conventional resource allocation method has a drawback in that the information amount increases due to the additional information for discriminating the frequency bands.

SUMMARY OF THE INVENTION

Accordingly, the present invention is designed to address at least the problems and/or disadvantages described above and to provide at least the advantages described below.

An aspect of the present disclosure provides a Physical Downlink Control Channel (PDCCH) transmission method of a base station for a mobile communication system based on an Orthogonal Frequency Division Multiple Access (OFDMA), with the method including acquiring downlink control information of a resource corresponding to a carrier among a plurality of carriers, identifying at least one Control Channel Element (CCE) index based on an indicator of the carrier among the plurality of carriers, generating a PDCCH for the downlink control information based on the identified CCE index, and transmitting the PDCCH through a predetermined carrier.

BRIEF DESCRIPTION OF DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Figure 1:
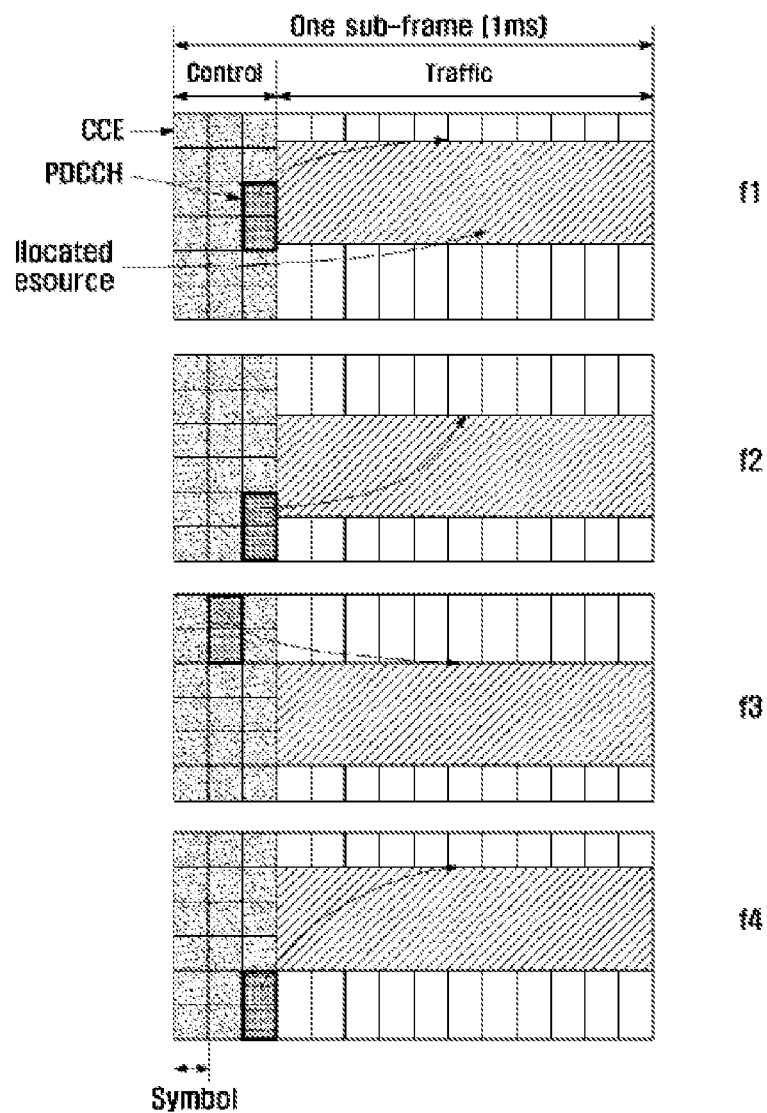
FIG. 1 is a diagram illustrating a downlink resource allocation procedure of a conventional LTE system.
Figure 2:
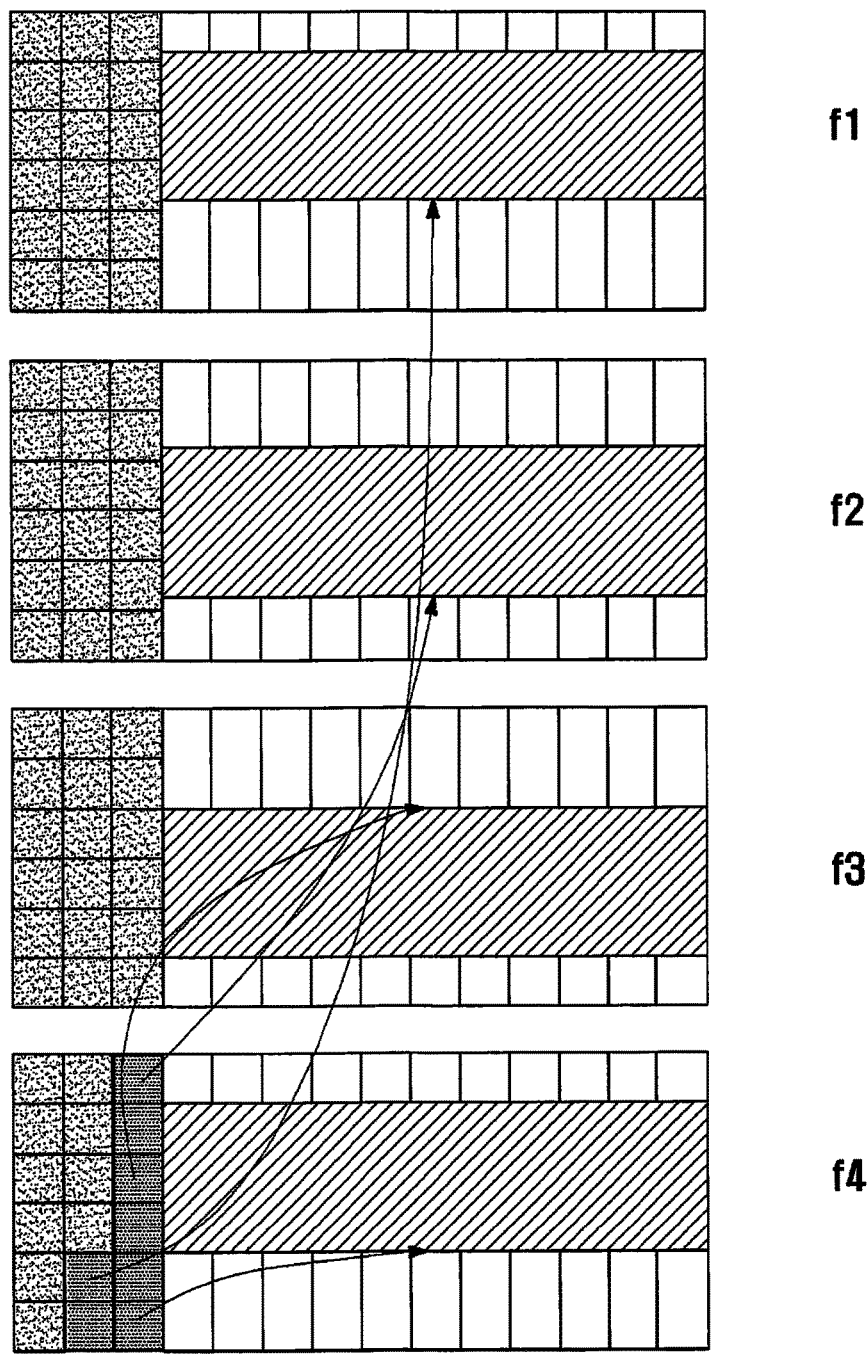
FIG. 2 is a diagram illustrating a downlink resource allocation procedure of a conventional LTE-A system.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention. The terms used in the following descriptions are defined in consideration of the corresponding functions in the present invention and thus can be replaced with other words according to the intention and practice of user and operator. Accordingly, the definitions of the terms should be made based on the contents through the entire description of the present invention.

Recently, various researches have been conducted for improving high speed data transmission efficiency of mobile communication systems using Orthogonal Frequency Division Multiplexing (OFDM) technologies. OFDM is a multicarrier modulation (MCM) scheme for transmitting data through multiple subcarriers in parallel. In an OFDM system, an input symbol stream is divided into several subsymbol streams and modulated into multiple orthogonal subcarriers for transmission.

The origins of OFDM started in the late 1950s with the Frequency Division Multiplexing for military communication purposes, OFDM using orthogonal overlapping multiple subcarriers has been developed in 1970s but limited in wide spread used due to the difficult of implementing orthogonal modulations between multiple carriers.

With the introduction of the idea of using a Discrete Fourier Transform (DFT) for implementation of the generation and reception of OFDM signals, by Weinstein, in 1971, the OFDM technology has developed rapidly. Additionally, the introduction of a guard interval at the start of each symbol and use of cyclic prefix (CP) overcomes the negative effects caused by multipath signals and delay spread.

With such technical advances, the OFDM technology is applied in various digital communications fields such as Digital Audio Broadcasting (DAB), Digital Video Broadcasting (DVB), Wireless Local Area Network (WLAN), and Wireless Asynchronous Transfer Mode (WATM). That is, the implementation of OFDM could be accomplished by reducing implementation complexity with the introduction of various digital signal processing technologies such as Fast Fourier Transform (FFT) and Inverse Fast Fourier Transform (IFFT). OFDM is similar to Frequency Division Multiplexing (FDM) but much more spectrally efficient for achieving high speed data transmission by overlapping multiple subcarriers orthogonally. Due to the spectral efficiency and robustness to the multipath fading, OFDM has been considered as a prominent solution for broadband data communication systems.

Other advantages of OFDM are to control the Intersymbol Interference (ISI) using the guard interval and reduce the complexity of equalizer in view of hardware as well as spectral efficiency and robustness to the frequency selective fading and multipath fading. OFDM is also robust to the impulse noise so as to be used for communication systems.

As aforementioned, the 3GPP LTE also has adopted OFDM as one of the key techniques. In the LTE system, the Physical Downlink Control Channel (PDCCH) is used as a downlink control channel for downlink resource allocation, uplink resource allocation, and uplink resource allocation broadcast control channel transmission. In the meantime, the LTE-A is plotted to secure 100 MHz bandwidth by aggregating 20 MHz bandwidths of 5 LTE systems and evolve to 5 LTE-A systems while maintaining use of 20 MHz LTE bands.

Figure 3:
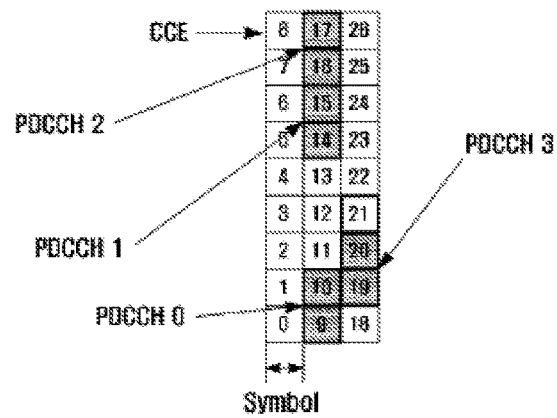
FIG. 3 is a diagram illustrating a concept of structuring downlink control channels for a resource allocation method according to the present invention.

FIG. 3 is a diagram illustrating a concept of structuring downlink control channels for a resource allocation method according to the present invention.

Referring to FIG. 3, the downlink control channel is mapped on the resource elements in up to 3 OFDM symbols in time domain and variable number of subcarriers in frequency domain. In frequency-time domain, the resource elements that are not used for Reference Signal (RS) are grouped into Resource Element Blocks (REGs) each consisting of four resource blocks, 9 REGs corresponds to a Control Channel Element, and a PDCCH is transmitted on 1, 2, 3, and 8 CCEs. In FIG. 3, each PDCCH is transmitted on two CCEs, i.e. PDCCH 0 on CCE 9 and CCE 10, PDCCH 1 on CCE 14 and CCE 15, PDCCH 2 on CCE 16 and CCE 17, and PDCCH 3 on CCE 19 and CCE 20.

In an exemplary embodiment of the present invention, the first CCE among the CCEs assigned for the PDCCHs is used for CCE index information. The method and apparatus for allocating resources of multiple carriers in a mobile communication according to the present invention is described in three exemplary embodiments.

Figure 4:
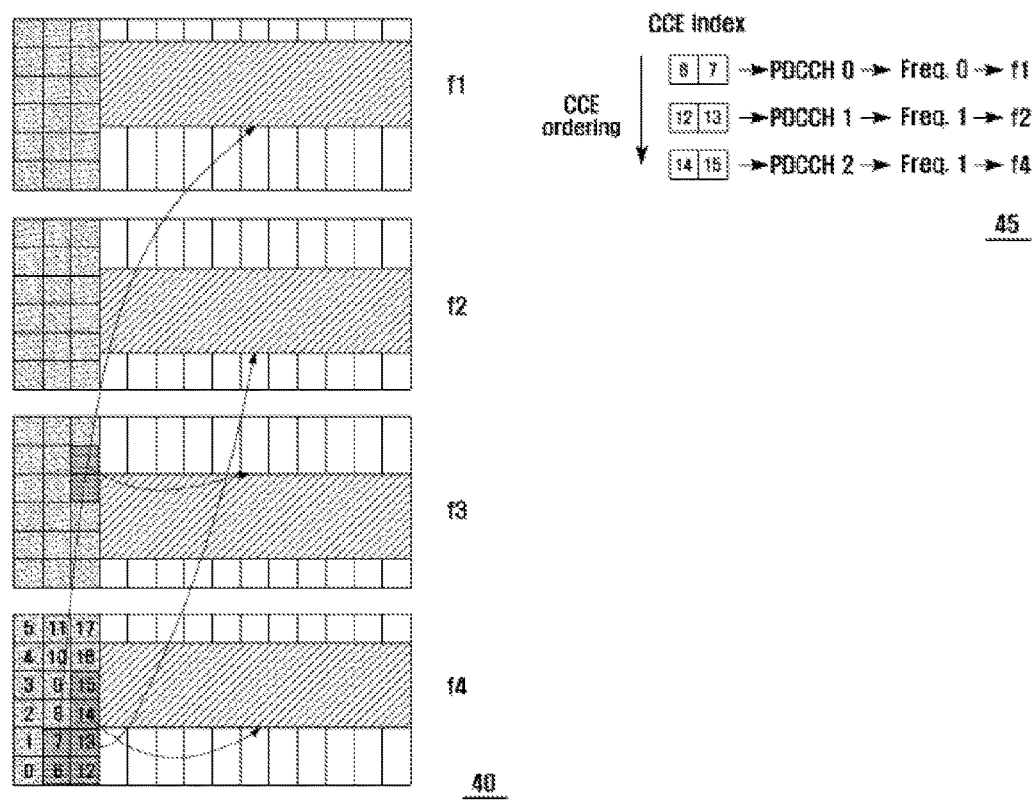
FIG. 4 is a diagram illustrating an exemplary resource allocation procedure according to the first embodiment of the present invention.

FIG. 4 is a diagram illustrating an exemplary resource allocation procedure according to the first embodiment of the present invention.

In the first embodiment of the present invention, a plurality of PDCCHs allocated in different frequency bands for a user equipment are arranged in order of the indices of CCEs on which the PDCCHs are transmitted. The PDCCHs arranged in the CCE index order are used for allocating resources in different frequency bands, and the base station allocates the traffic resource within a frequency band using the PDCCHs as follows. In an exemplary embodiment of the present invention, the PDCCH can be used for the purpose of uplink or downlink resource allocation or Multiple Input Multiple Output (MIMO) resource allocation. Multiple PDCCHs can be generated with different types or different Downlink Control Indicators (DCIs). For instance, the PDCCH of the first frequency band f1 can carry a downlink grant for Single Input Single Output (SISO) while the PDCCH of the second frequency band f2 carries downlink grant for MIMO. The multiple PDCCHs can be used for allocating multiple uplink resources or multiple downlink resources or multiple uplink and downlink resources to a user equipment.

The resource allocation method according to the first embodiment of the present invention operates as follows. The base station scheduler first acquires the information on the resources to be allocated within the respective frequency bands. Next, the base station scheduler determines the numbers of PDCCHs to be used in the respective frequency bands on the basis of channel conditions of control channels of the respective frequency bands. Next, the base station transmits, when a frequency band in which the number of PDCCH is 1 exists, the PDCCH on the control channel of the corresponding frequency band. In the resource grid denoted by reference number 40, transmitting the PDCCH in the frequency band f3 means that the PDCCH is used for allocating resource within the frequency band f3. Finally, the base station transmits multiple PDCCHs of different frequency bands, as arranged in index order of CCEs on which the PDCCHs are transmitted, through the control channel of one frequency band.

As shown in the resource grid denoted by reference number 40, the resources of the frequency bands f1, f2, and f4 are allocated using the control channel of frequency band f4. In this case, the PDCCH determined for allocating the resource of the frequency band f1 is transmitted on the CCEs having the lowest CCE indices, the PDCCH determined for allocating the resource of the frequency band f2 is transmitted on the CCEs having the next lowest CCE indices, and the PDCCH determined for allocating the resource of the frequency band f4 is transmitted on the CCEs having the highest CCE indices. That is, the base station arranges the multiple PDCCHs in ascending index order of CCEs on which the PDCCHs are transmitted and maps the CCE indices to the indices of the frequency bands f1, f2 and f4 arranged in ascending order as shown in the part denoted by reference number 45 of FIG. 4.

A method for locating the resources allocated within the respective frequency bands in a user equipment is described hereinafter. Referring to the resource block 40 of FIG. 4, the user equipment receives the PDCCH for the frequency band fi3 through the control channel of the frequency band f3 and the PDCCHs for the frequency bands f1, f2, and f4 through the control channel of the frequency band f4.

The user equipment first locates the resource allocated within the frequency band of which control channel is carrying a single PDCCH. The frequency band of which control channel is used for carrying the single PDCCH is excluded when locating the resources using the multiple PDCCHs transmitted in one frequency band. Next, the user equipment receives the multiple PDCCHs through the control channel of the frequency band f4; locates the resource indicated by the PDCCH referenced with the lowest CCE index within the frequency band f1, the resource indicated by the PDCCH reference with the next lowest CCE index within the frequency band f2, and resource indicated by the PDCCH reference with the highest CCE index within the frequency band f4.

In the first embodiment of the present invention, the resources of multiple frequency bands are allocated using the order of indices of the CCEs on which the PDCCHs are transmitted. Here, a rule should be included that the aggregation of multiple PDCCHs can be allowed for one frequency band. This means that the each of the rest frequency bands is allowed for carrying one or no PDCCH. This is because the mapping between the CCEs indices referencing the PDCCHs and frequency band indices can become complex if multiple PDCCHs are transmitted in multiple frequency bands.

Figure 5:
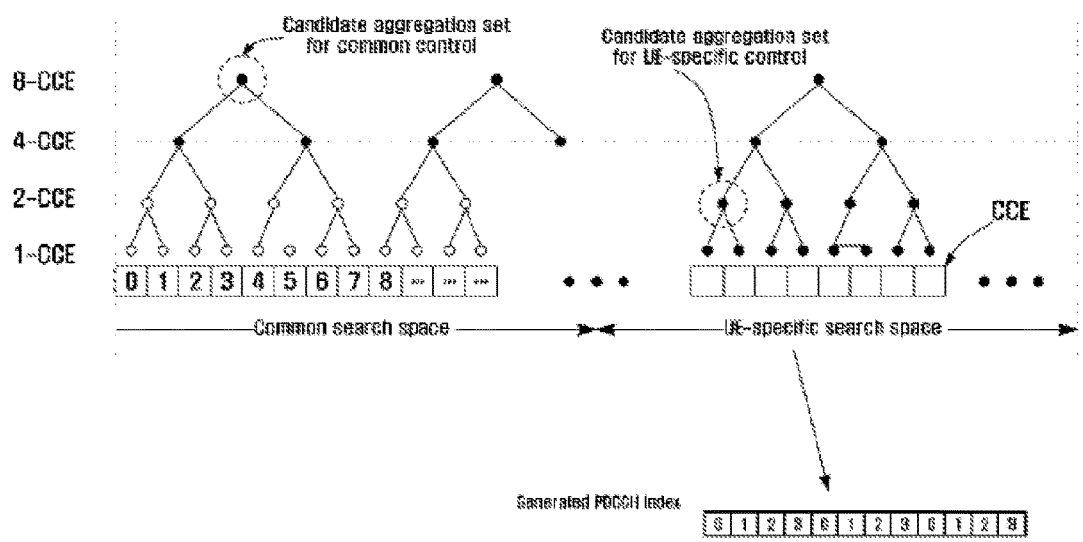
FIG. 5 is a diagram illustrating a concept of the resource allocation method according to the second embodiment of the present invention.

FIG. 5 is a diagram illustrating a concept of the resource allocation method according to the second embodiment of the present invention.

Referring to FIG. 5, the resource allocation method according to the second embodiment of the present invention allocates resources of multiple frequency bands using the CCE index information of the multiple PDCCHs transmitted in one frequency band. As shown in FIG. 5, the number of CCEs on which the PDCCH is transmitted is 1, 2, 4, or 8 and can be presented in the form of a tree. That is, the PDCCH transmitted on a single CCE is indicated with the CCE index (0, 1, 2, 3, . . . ), the PDCCH transmitted on two CCEs is indicated with the index of the first one of two consecutive CCEs (0, 2, 4, 8, . . . ), the PDCCH transmitted on three CCEs is indicated with the index of the first one of four consecutive CCEs (0, 4, 8, 12), and the PDCCH transmitted on four CCEs is indicated with the index of the first one of 8 consecutive CCEs (0, 8, 16, . . . ).

In the user equipment, the demodulation is performed with a common demodulation region and a dedicated demodulation region in the control channel. In order to reduce power consumption of the user equipment, the base station transmits the PDCCH in the common demodulation region and the dedicated demodulation region, and the user equipment demodulates the data in the common and dedicated demodulation regions. In this embodiment, the resources of multiple frequency bands are allocated in the demodulation region dedicated to the user equipment. The information on the frequency band in which the multiple PDCCHs are transmitted can be expressed as equation (1).

$$(\text{First CCE index of PDCCH}/L\_PDCCH) \bmod N\_freq = freq.index \quad (1)$$

where L_PDCCH denotes a length of PDCCH, i.e. a number of CCEs on which one PDCCH is transmitted. That is, when a PDCCH is transmitted on 4 CCEs, L_PDCCH is 4. N_freq denotes a number of entire available frequency bands.

How to indicate frequency information using equation (1) is described with an exemplary case.

Figure 6:
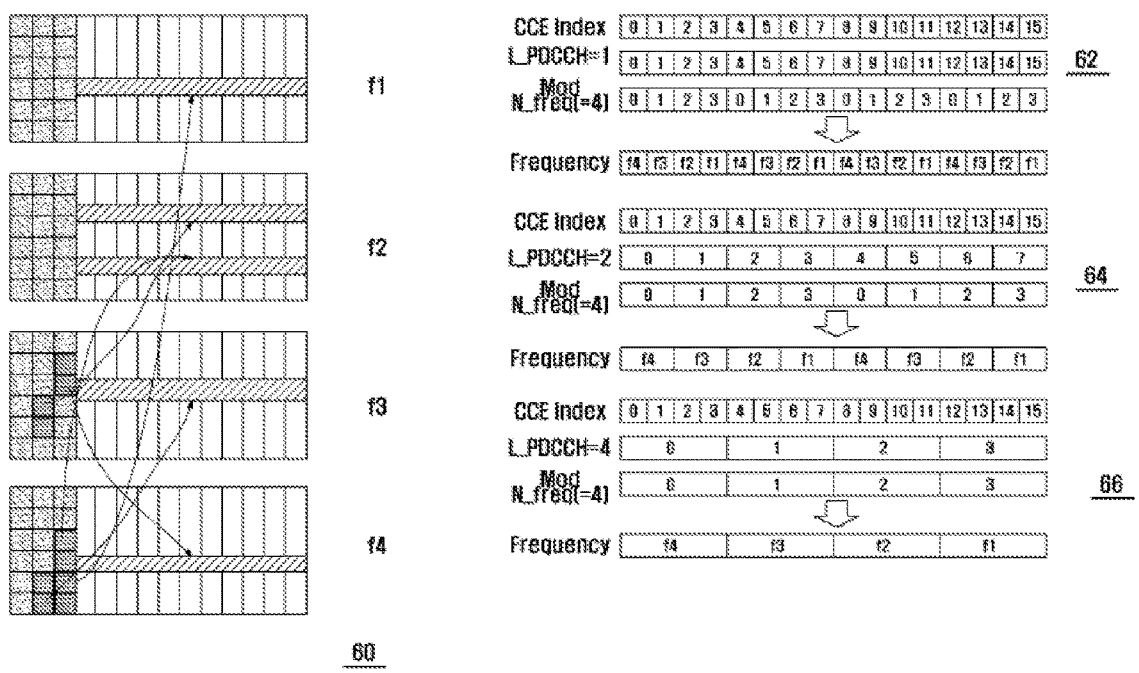
FIG. 6 is a diagram illustrating an exemplary resource allocation operation in the resource allocation method according to the second embodiment of the present invention.

FIG. 6 is a diagram illustrating an exemplary resource allocation operation in the resource allocation method according to the second embodiment of the present invention. In FIG. 6, reference number 60 denotes a set of frequency bands in which multiple PDCCHs are transmitted in some frequency bands (frequency bands f3 and f4) but no PDCCH in some frequency bands (frequency bands f1 and f2), and reference number 62 denotes a PDCCH-frequency band mapping scheme when the L_PDCCH is 1 and the N_freq is 4, reference number 64 denotes a PDCCH-frequency band mapping scheme when the L_PDCCH is 2 and the N_freq is 4, and reference number 66 denotes a PDCCH-frequency band mapping scheme when the L_PDCCH is 4 and the N_freq is 4.

How the PDCCHs are mapped to the frequency bands are described with reference to the PDCCH-frequency band mapping scheme 64 in which the L_PDCCH is 2 and the N_freq is 4. In this case, the PDCCHs, arranged as shown in the set of frequency bands 60, can be referenced with the CCE indices of 0, 2, 4, 6, and 8, and theses CCE indices are interpreted into PDCCH indices of 0, 1, 2, 3, 0, 1, 2, 3, 0, 1, 2, 3 using equation (1). Assuming that the PDCCH indices are designated as follows: index 0=f4, index 1=f3, and index 2=f2, and index 3=f1.

In a second embodiment, the base station can allocate the resources of multiple frequency bands using the PDCCH indices referencing the PDCCHs. For instance, the resource of the frequency band f2 can be allocated by transmitting the PDCCH of which PDCCH index is 1.

Figure 7:
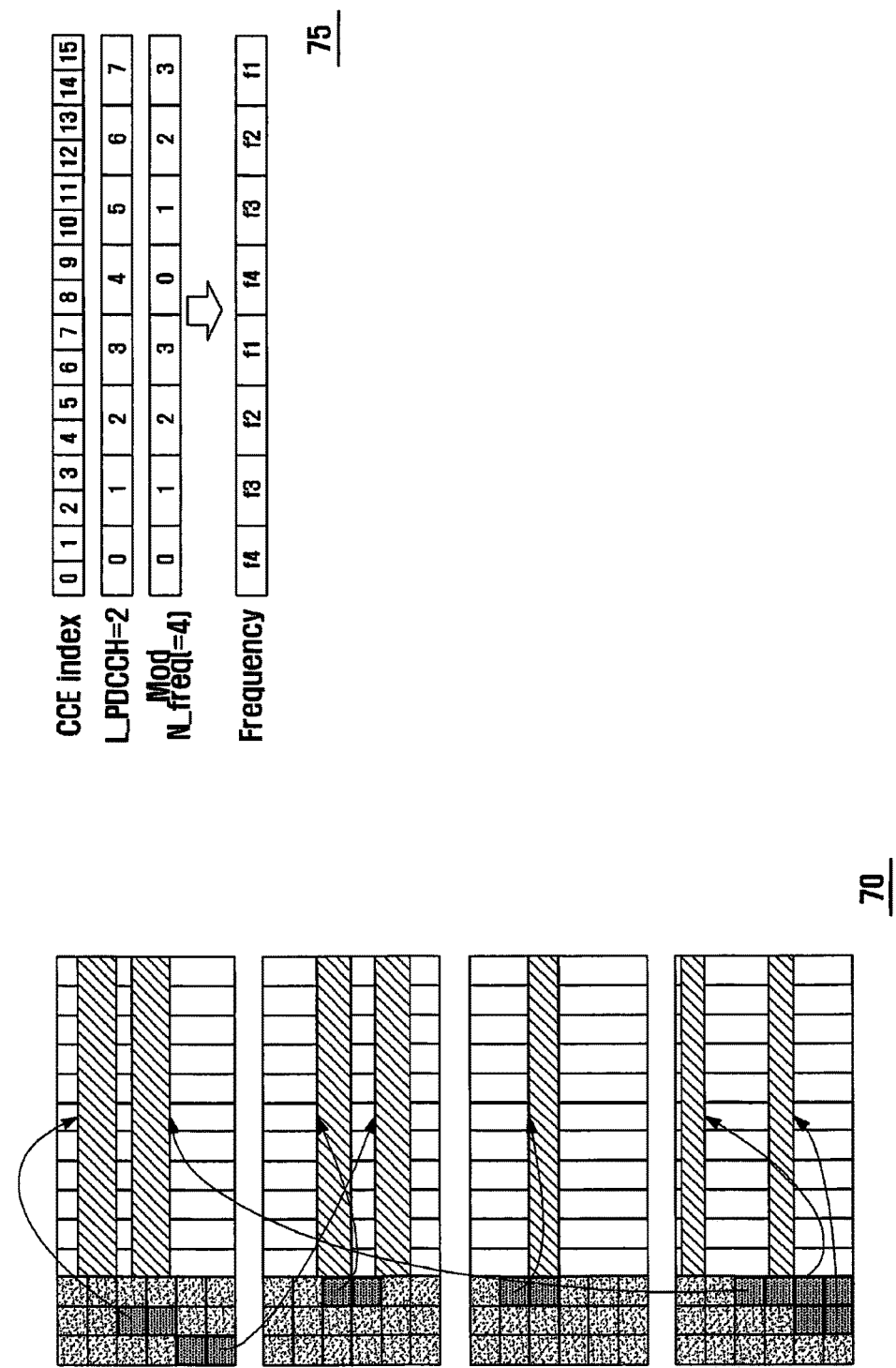
FIG. 7 is a diagram illustrating an exemplary resource allocation operation in the resource allocation method according to the third embodiment of the present invention.

A resource allocation method using the rule of equation (1) according to the third embodiment of the present invention is described hereinafter. FIG. 7 is a diagram illustrating an exemplary resource allocation operation in the resource allocation method according to the third embodiment of the present invention. In FIG. 7, reference number 70 denotes a set of frequency bands in which multiple PDCCHs are transmitted in some frequency bands (frequency bands f1 and f4) and one PDCCH in some frequency bands (frequency bands f2 and f3), and reference number 75 denotes a PDCCH-frequency band mapping scheme when the L_PDCCH is 2 and N_freq is 4.

In a third embodiment, when a single PDCCH is transmitted in a frequency band, the resource of the corresponding frequency band is allocated without abiding by the rule of equation (1). Otherwise, when multiple PDCCHs are transmitted in a frequency band, a specific frequency band can be indicated using the PDCCH abiding by the rule of equation (1). In the third embodiment, the resource of the frequency band in which a PDCCH is transmitted can be allocated with multiple PDCCHs that are transmitted in another frequency band.

Figure 8:
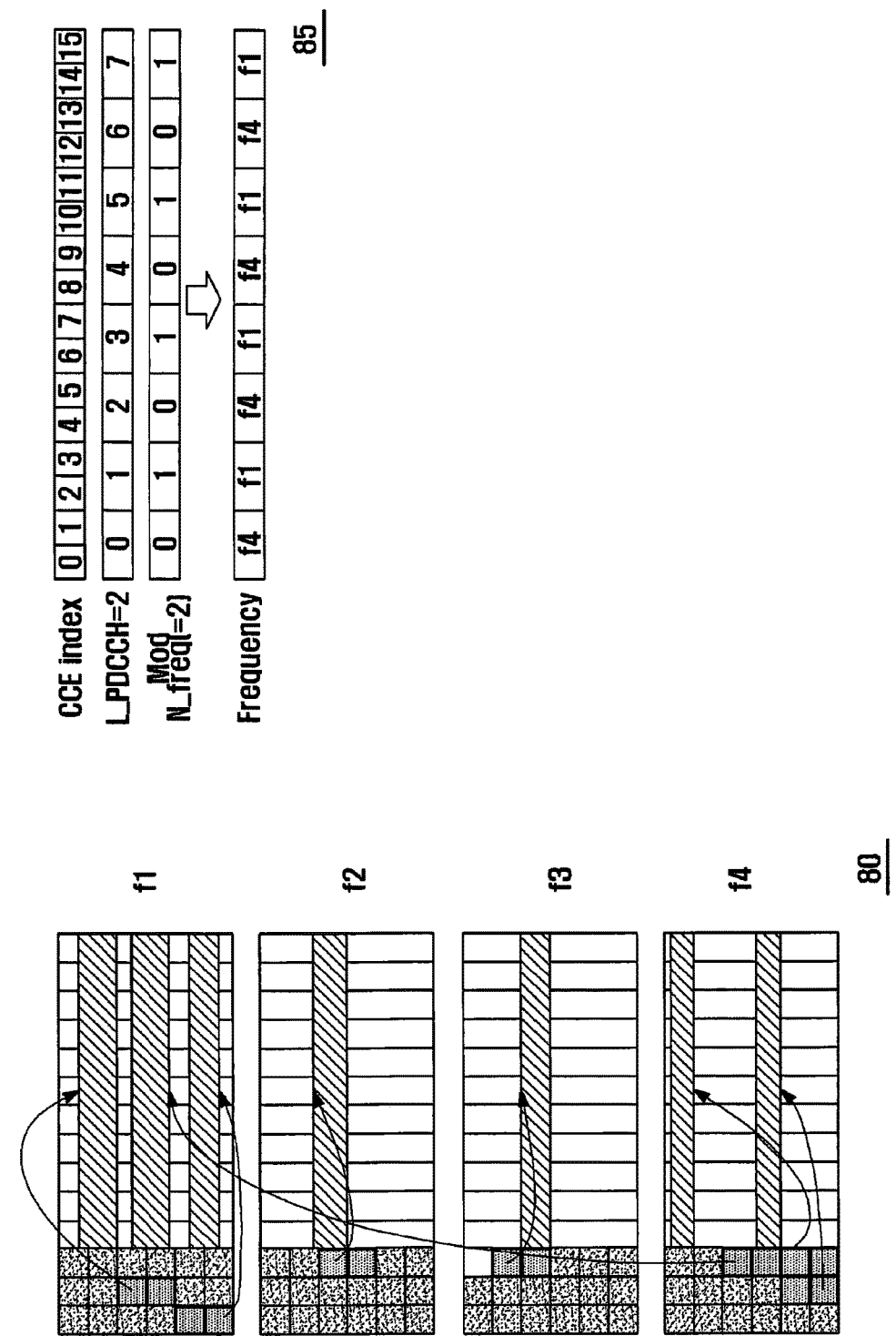
FIG. 8 is a diagram illustrating an exemplary resource allocation operation in the resource allocation method according to the fourth embodiment of the present invention.

FIG. 8 is a diagram illustrating an exemplary resource allocation operation in the resource allocation method according to the fourth embodiment of the present invention. In the fourth embodiment of the present invention, the resource of the frequency band in which a PDCCH is transmitted cannot be allocated with multiple PDCCHs that are transmitted in another frequency band unlike in the third embodiment. In FIG. 8, reference number 80 denotes a set of frequency bands in which multiple PDCCHs are transmitted in some frequency bands (frequency bands f1 and f4) and on PDCCH in some frequency bands (frequency bands f2 and f3), and reference number 85 denotes a PDCCH-frequency band mapping scheme in which the value of N_freq is reset to 2 by excluding the frequency bands in which one PDCCH is transmitted.

In order for the user equipment to reduce the power consumption caused by decoding all CCEs which the user equipment searches for, the base station transmits a 1-bit information, along with the PDCCH having the lowest PDCCH index, indicating whether the current frequency band is used for transmitting a single PDCCH or multiple PDCCHs.

Figure 9:
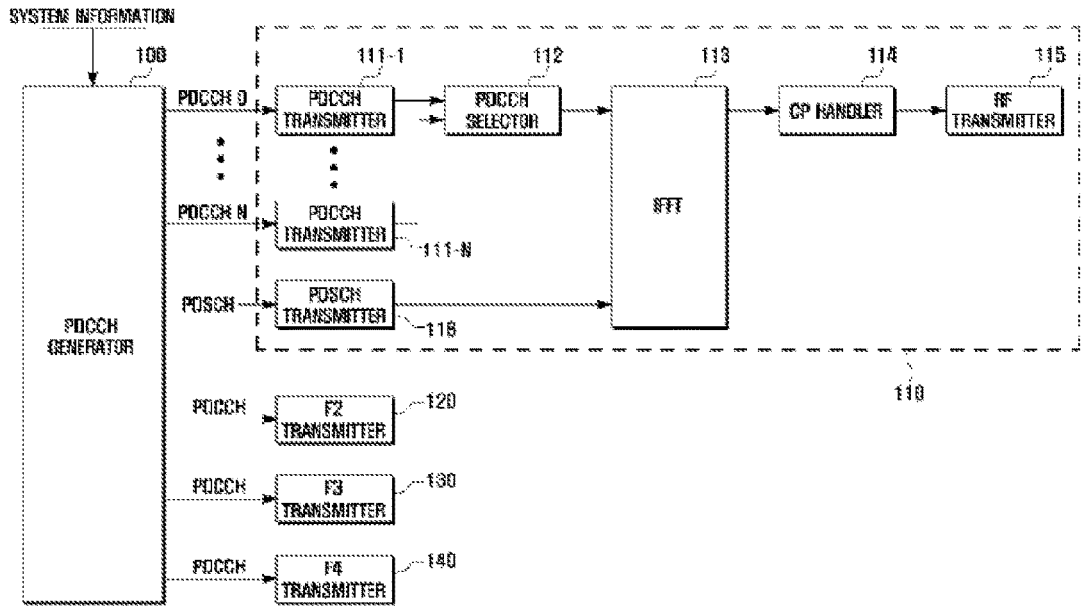
FIG. 9 is a block diagram illustrating a configuration of a base station apparatus for transmitting multiple PDCCHs carrying multicarrier resource allocation information according to an exemplary embodiment of the present invention.

FIG. 9 is a block diagram illustrating a configuration of a base station apparatus for transmitting multiple PDCCHs carrying multicarrier resource allocation information according to an exemplary embodiment of the present invention.

As shown in FIG. 9, the base station apparatus includes a PDCCH generator 100, an f1 transmitter 110, an f2 transmitter 120, an f3 transmitter 130, and an f4 transmitter 140.

The PDCCH 100 generates PDCCHs to be transmitted in respective frequency bands using system information. The transmitters 110 to 140 performs IFFT on the PDSCH DATA generated by Physical Downlink Shared Channel (PDSCH) generators (not shown) and the PDCCH data and transmits the IFFT transformed data through corresponding frequency bands. In FIG. 9, four transmitters (i.e. f1 to f4 transmitters) 110 to 140 operating on the frequency bands f1 to f4 are depicted as an example. Each of the f1 to f4 transmitters 110 to 140 can be provided with a plurality of PDCCH transmitters 111-1 to 111-N, a PDSCH transmitter 118, a PDCCH selector 112, an IFFT 113, an Cyclic Prefix (CP) handler 114, and an RF transmitter 115.

The PDCCH transmission operation is described with the example of the f1 transmitter 110. A plurality of PDCCH transmitters 111-1 to 11-N process the corresponding PDCCH data output by the PDCCH generator 100 so as to output the PDCCH data in an appropriate transmission format, and the PDCCH selector 112 selects one or more PDCCH outputs of the PDCCH transmitters 111-1 to 111-N. The PDSCH transmitter 118 processes the PDSCH data output by a PDSCH generator (not shown) so as to output the PDSCH data in an appropriate transmission format. The IFFT 113 performs IFFT on the PDCCH data output by the PDCCH selector 112 and the PDSCH data output by the PDSCH transmitter 118, the CP handler 114 adds a CP to the IFFT transformed data, and the RF transmitter 115 transmits the output signal of the CP handler 114 after up-converting to the radio frequency signal.

Here, the f2 to f4 transmitters 120 to 140 have the same internal configuration as the f1 transmitter f1. Accordingly, each of the f1 to f4 transmitters 110 to 140 performs IFFT on the PDCCH data output from the PDCCH selector 112 and the PDSCH data output from the PDSCH transmitter 118 by means of the IFFT 113, adds a CP to the signal output by the IFFT 113, and transmits the CP-inserted signal after up-converting to a radio signal by means of the RF transmitter 115 through a corresponding frequency band, i.e. one of f1 to f4.

Figure 10:
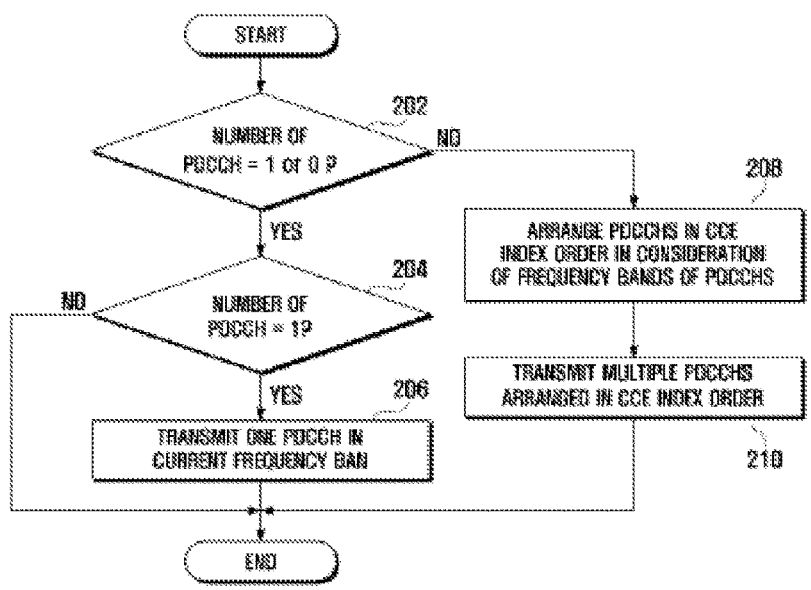
FIG. 10 is a flowchart illustrating a resource allocation method for an OFDMA-based communication system according to the first embodiment of the present invention.

FIG. 10 is a flowchart illustrating a resource allocation method for an OFDMA-based communication system according to the first embodiment of the present invention.

Referring to FIG. 10, the base station apparatus first determines whether a number of PDCCHs to be transmitted in the current frequency band is equal to or less than one (202). The number of PDCCHs can be zero, one, or more. If the number of PDCCHs to be transmitted in the current frequency band is equal to or less than one, then the base station apparatus at step 202 determines whether the number of PDCCH to be transmitted is one (204). If the number of PDCCH to be transmitted is not one, i.e. zero, then the base station apparatus terminates the PDCCH transmission procedure.

Otherwise, if the number of PDCCH to be transmitted is one, then the base station apparatus transmits the PDCCH by means of a corresponding frequency band transmitter (206) and terminates the PDCCH transmission procedure. If the number of PDCCHs to be transmitted in the current frequency band is not equal to or less than one at step 202, i.e. if multiple PDCCHs are transmitted in the current frequency band, then the base station apparatus arranges the multiple PDCCHs on the CCEs of the current frequency band in consideration of the original frequency bands of the PDCCHs such that the index of the first one of CCEs for carrying each PDCCH can be interpreted into a frequency band index (208), and transmits the arranged multiple PDCCHs by means of a corresponding frequency band transmitter (210). That is, when multiple PDCCHs for allocating the resources of different frequency bands are required to be transmitted through a single frequency band, the base station apparatus arranges the multiple PDCCHs on the CCEs of the current frequency band that are interpreted into the indices of the original frequency bands of the PDCCHs, and transmits the PDCCHs arranged as such on the CCEs. At this time, the frequency bands in which one PDCCH is transmitted are excluded from the list of the candidate frequency bands for transmitting multiple PDCCHs.

Figure 11:
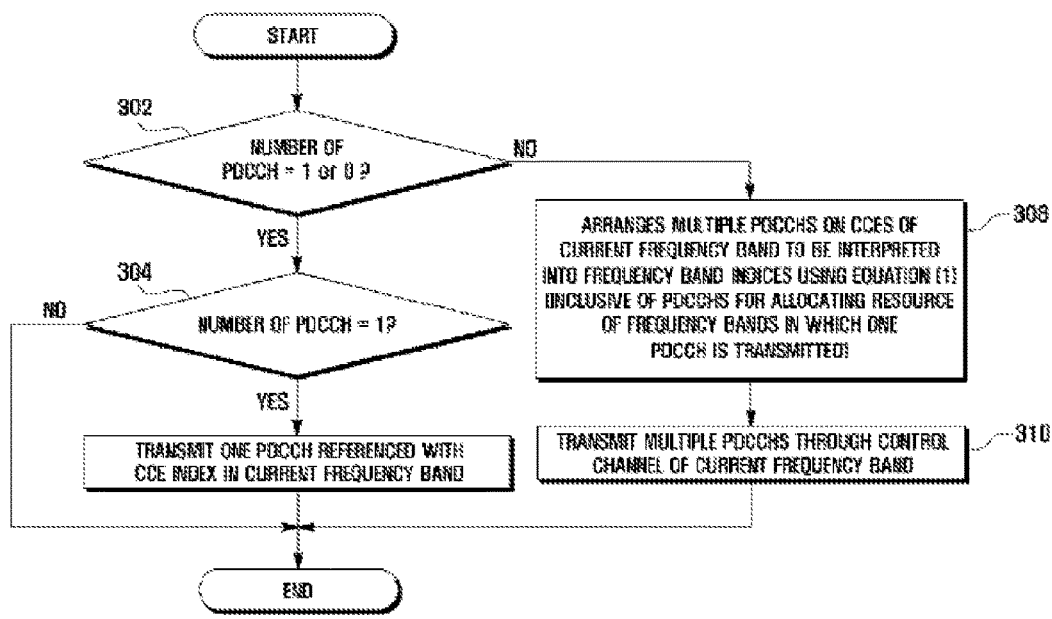
FIG. 11 is a flowchart illustrating a resource allocation method for an OFDMA-based communication system according to the second embodiment of the present invention.

FIG. 11 is a flowchart illustrating a resource allocation method for an OFDMA-based communication system according to the second embodiment of the present invention.

Referring to FIG. 11, the base station apparatus first determines whether a number of PDCCHs to be transmitted in the current frequency band is equal to or less than one (302). If the number of PDCCHs to be transmitted in the current frequency band is equal to or less than one, then the base station apparatus determines whether the number of PDCCHs is one (304). If the number of PDCCHs to be transmitted is not one, i.e. zero, then the base station apparatus terminates the PDCCH transmission procedure. Otherwise, if the number of PDCCHs to be transmitted is one, then the base station apparatus transmits the PDCCH which is referenced with a CCE index in the current frequency band (306) and terminates the PDCCH transmission procedure. If the number of PDCCHs to be transmitted in the current frequency band is not equal to or less than one at step 302, i.e. if multiple PDCCHs are required to be transmitted in the current frequency band, then the base station apparatus arranges the multiple PDCCHs (including the PDCCHs for allocating the resources of the frequency band in which one PDCCH is transmitted already) on the CCEs of the current frequency band such that the corresponding CCE indices are interpreted into the frequency band indices by using equation (1) (308), and transmits the multiple PDCCHs by means of the corresponding frequency band transmitter (310). It is noted that the resource of the frequency band in which one PDCCH is transmitted can be allocated with another PDCCH transmitted in the current frequency band again at step 308.

In short, the PDCCH transmission procedure according to the second embodiment of the present invention is performed as follows. When no PDCCH is required to be transmitted in the current frequency band, the PDCCH transmission procedure is terminated. When one PDCCH is required to be transmitted in the current frequency band, the PDCCH is transmitted on the CCEs that are randomly selected in the current frequency band. When multiple PDCCHs are required to be transmitted in the current frequency band, the PDCCHs are transmitted on the CCEs of which indices are interpreted into the frequency band indices by using equation (1).

Figure 12:
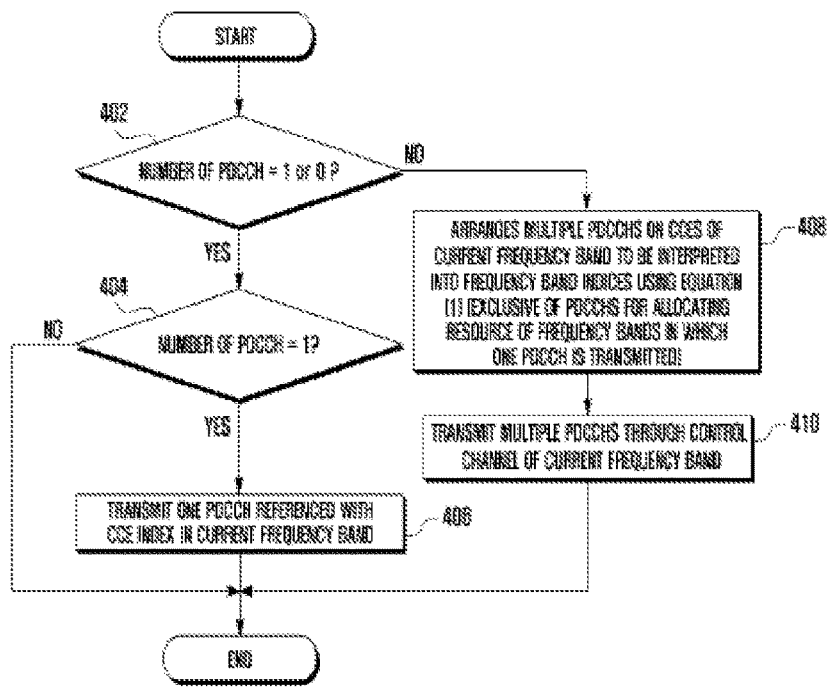
FIG. 12 is a flowchart illustrating a resource allocation method for an OFDMA-based communication system according to the third embodiment of the present invention.

FIG. 12 is a flowchart illustrating a resource allocation method for an OFDMA-based communication system according to the third embodiment of the present invention.

Referring to FIG. 12, the base station apparatus first determines whether a number of PDCCHs to be transmitted in the current frequency band is equal to or less than one (402). If the number of PDCCHs to be transmitted in the current frequency band is equal to or less than one, then the base station apparatus determines whether the number of PDCCHs is on (404). If the number of PDCCHs to be transmitted is not one, i.e. zero, then the base station apparatus terminates the PDCCH transmission procedure. Otherwise, if the number of PDCCHs to be transmitted is one, then the base station apparatus transmits the PDCCH which is referenced with a CCE index in the current frequency band (406) and terminates the PDCCH transmission procedure. If the number of PDCCHs to be transmitted in the current frequency band is not equal to or less than on at step 402, i.e. if multiple PDCCHs are required to be transmitted in the current frequency band, the base station apparatus arranges the multiple PDCCHs (excluding the PDCCH for allocating the resource of the frequency band in which one PDCCH is transmitted already) on the CCEs of the current frequency band such that the corresponding CCE indices are interpreted into the frequency band indices by using equation (1) (408), and transmits the multiple PDCCHs by means of the corresponding frequency band transmitter (410). It is noted that the resource of the frequency band in which one PDCCH is transmitted cannot be allocated with another PDCCH transmitted in the current frequency band at step 408 unlike the second embodiment.

In short, the PDCCH transmission procedure according to the third embodiment of the present invention is performed as follows. When no PDCCH is required to be transmitted in the current frequency band, the PDCCH transmission procedure is terminated. When one PDCCH is required to be transmitted in the current frequency band, the PDCCH is transmitted on the CCEs that are randomly selected in the current frequency band. When multiple PDCCHs are required to be transmitted in the current frequency band, the PDCCHs are transmitted on the CCEs of which indices are interpreted into the frequency band indices by using equation (1).

Figure 13:
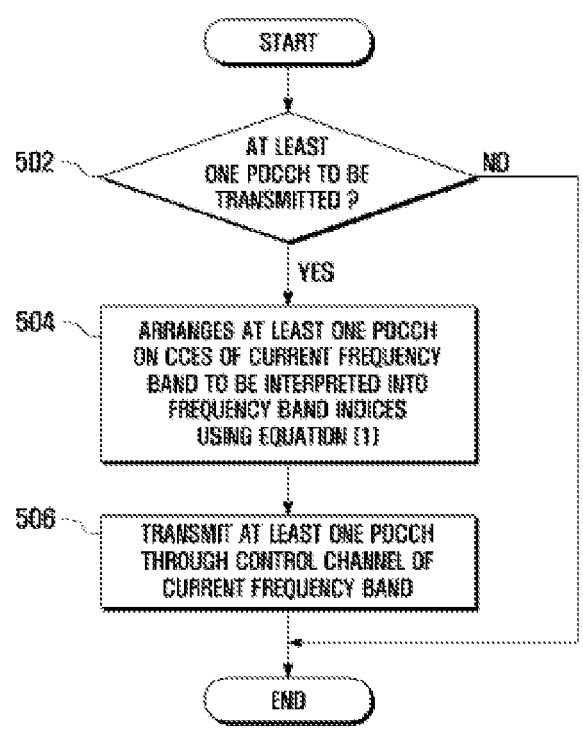
FIG. 13 is a flowchart illustrating a resource allocation method for an OFDMA-based communication system according to the fourth embodiment of the present invention.

FIG. 13 is a flowchart illustrating a resource allocation method for an OFDMA-based communication system according to the fourth embodiment of the present invention.

Referring to FIG. 13, the base station apparatus first determines whether there is at least one PDCCH to be transmitted in the current frequency band (502). If no PDCCH to be transmitted exists, the base station apparatus terminates the PDCCH transmission procedure. Otherwise, if there is at least one PDCCH to be transmitted in the current frequency band, the base station apparatus arranges the at least one PDCCH on the CCEs of the current frequency band such that the corresponding CCE indices are interpreted into the frequency band indices by using equation (1) and transmits the at least one PDCCHs by means of the corresponding frequency band transmitter (506).

In short, the PDCCH transmission procedure according to the fourth embodiment of the present invention is performed as follows. When no PDCCH is required to be transmitted in the current frequency band, the PDCCH transmission procedure is terminated. When at least one PDCCH is required to be transmitted in the current frequency band, the PDCCH is transmitted on the CCEs of which indices are interpreted into the frequency band indices by using equation (1).

The base station apparatus is configured as shown in FIG. 9 and can operate as shown in one of FIGS. 10 to 13 to transmit multiple PDCCHs. The user equipment must be configured to receive the multiple PDCCHs for allocating resources in different frequency bands through one of the frequency bands and process the multiple PDCCHs received in the frequency band.

Figure 14:
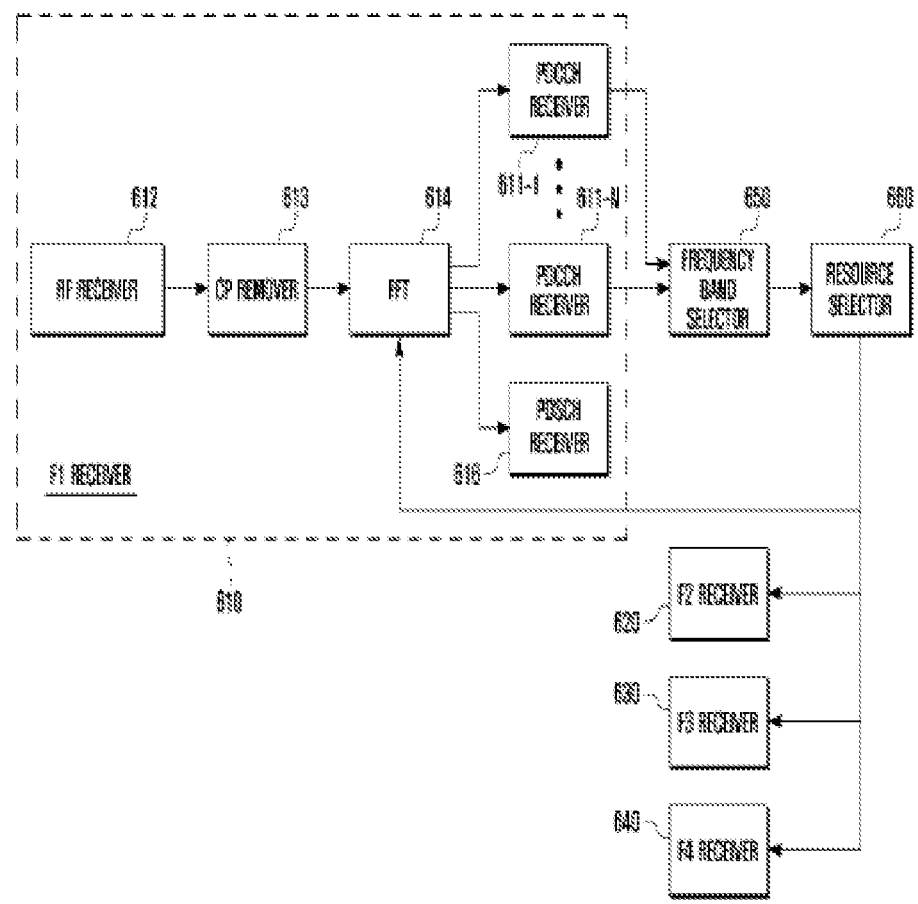
FIG. 14 is a block diagram illustrating a configuration of a user equipment for receiving multiple PDCCHs in different frequency band according to an exemplary embodiment of the present invention.

FIG. 14 is a block diagram illustrating a configuration of a user equipment for receiving multiple PDCCHs in different frequency band according to an exemplary embodiment of the present invention.

As shown in FIG. 14, the user equipment includes an f1 receiver 610, an f2 receiver 620, an f3 receiver 630, an f4 receiver 640, a frequency band selector 650, and a resource selector 660. The user equipment is provided with multiple frequency band receivers that are responsible for receiving signals in the corresponding frequency bands. In FIG. 14, four frequency band receivers 610 to 640 operating on the frequency bands f1 to f4 are depicted as an example, each of the f1 to f4 receivers 610 to 640 includes an RF receiver 612 for receiving radio frequency signal transmitted by the base station through corresponding frequency band, down-converting the radio frequency signal into base band signal, and converting the base band analog signal into digital signal; a CP remover 613 for removing the CP from the signal output by the RF receiver 612; an FFT 614 for performing FFT on the signal output by the CP remover 613 to recover the signal that are IFFT converted by the base station; a plurality of PDCCH receivers 611-1 to 611-N for extracting the PDCCHs from the signal output by the FFT 614; and a PDSCH receiver 616 for extracting the PDSCH from the signal output by the FFT 714. The frequency band selector 650 selects one of PDCCHs output by the multiple PDCCH receiver 611-1 to 611-N, and the resource selector 660 provides the f1 to f4 receivers 610 to 640 with the information on the PDCCH selected by the frequency band selector 650 to locate the resources allocated in the corresponding frequency bands.

As described above, each frequency band receiver of the user equipment converts the RF signal transmitted by the base station into a baseband signal and then a digital signal by means of the RF receiver 612, removes a CP from the digital by means of the CP remover 613, and performs FFT conversion by means of the FFT 614 so as to output frequency domain signals in parallel. The frequency domain signals are output to the corresponding PDCCH receivers 611-1 to 611-N and the PDSCH receiver 616. The PDCCH receiver 611-1 to 611-N outputs the PDCCHs extracted from the frequency domain signals to the frequency band selector 650, and the frequency band selector 650 output the PDCCHs to the resource selector 660 selectively such that the resource selector 660 provides the frequency band receivers 610, 620, 630, and 640 with the information on the resources allocated in the respective frequency bands. Accordingly, the frequency band receivers 610, 620, 630, and 640 can decode the PDSCHs of the respective frequency bands on the basis of the resource location information provided by the resource selector 660.

Figure 15:
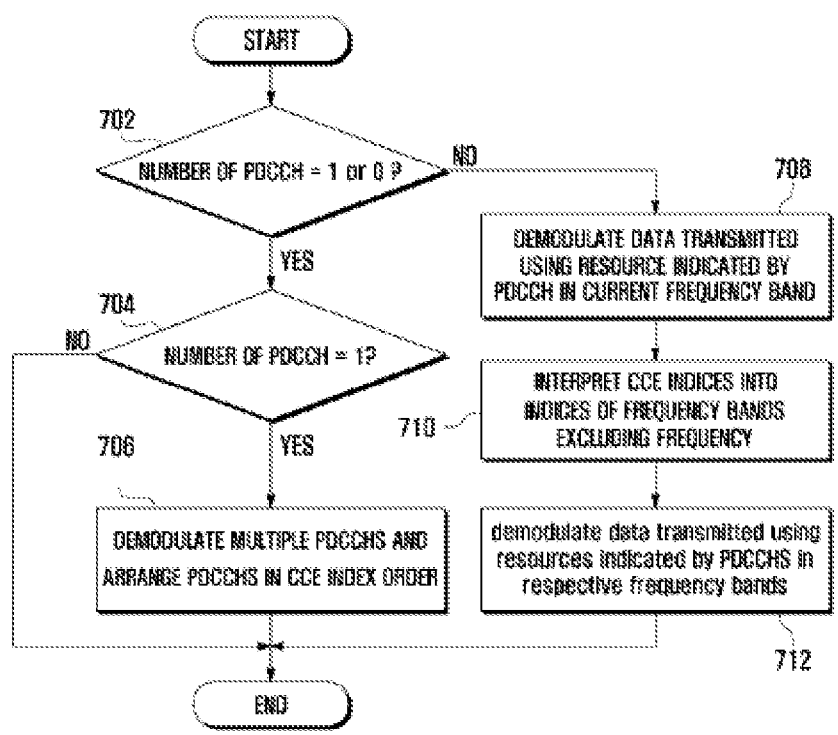
FIG. 15 is a flowchart illustrating a data reception method for an OFDMA-based communication system according to the first embodiment of the present invention.

FIG. 15 is a flowchart illustrating a data reception method for an OFDMA-based communication system according to the first embodiment of the present invention.

Referring to FIG. 15, when a control channel is received in a frequency band, the user equipment first determines whether a number of PDCCHs received in the current frequency band is equal to or less than one (702). If the number of PDCCHs received in the current frequency band is equal to or less than one, then the user equipment determines whether the number of PDCCHs received in the current frequency band is one (704). If the number of PDCCHs received in the current frequency band is not one (i.e. if no PDCCH is received), then the user equipment terminates the PDCCH processing procedure. Otherwise, if the number of PDCCHs received in the current frequency band is one, then the user equipment locates the resource indicated by the PDCCH in the current frequency band and demodulates the data transmitted using the resource (706) and terminates the PDCCH processing procedure. If the number of the PDCCHs received in the current frequency band is not equal to or less than one (i.e. if multiple PDCCHs are received in the current frequency band) at step 702, then the user equipment demodulates the multiple PDCCHs and arranges the PDCCHs in ascending order of indices of the CCEs on which the PDCCHs are transmitted (708). Next, the user equipment interprets the CCE indices into the indices of frequency bands excluding the frequency band in which one PDCCH is transmitted (710). Finally, the user equipment locates the resources indicated by the PDCCHs in the frequency bands identified using the frequency band indices obtained by interpreting the CCE indices and demodulates the data transmitted using the resources located in respective frequency band (712), and terminates the PDCCH processing procedure.

In the data reception method according to the first embodiment of the present invention, the user equipment terminates the PDCCHs processing procedure immediately when no PDCCH is received in the current frequency band; demodulates, when one PDCCH is received in the current frequency band, the data transmitted in the resource indicated by the PDCCH within the current frequency band; and demodulates, when multiple PDCCHs are received in the current frequency band, the data transmitted in the resources indicated by the PDCCHs in the frequency bands identified using the frequency band indices obtained by interpreting the indices of the CCEs on which the PDCCHs are transmitted.

Figure 16:
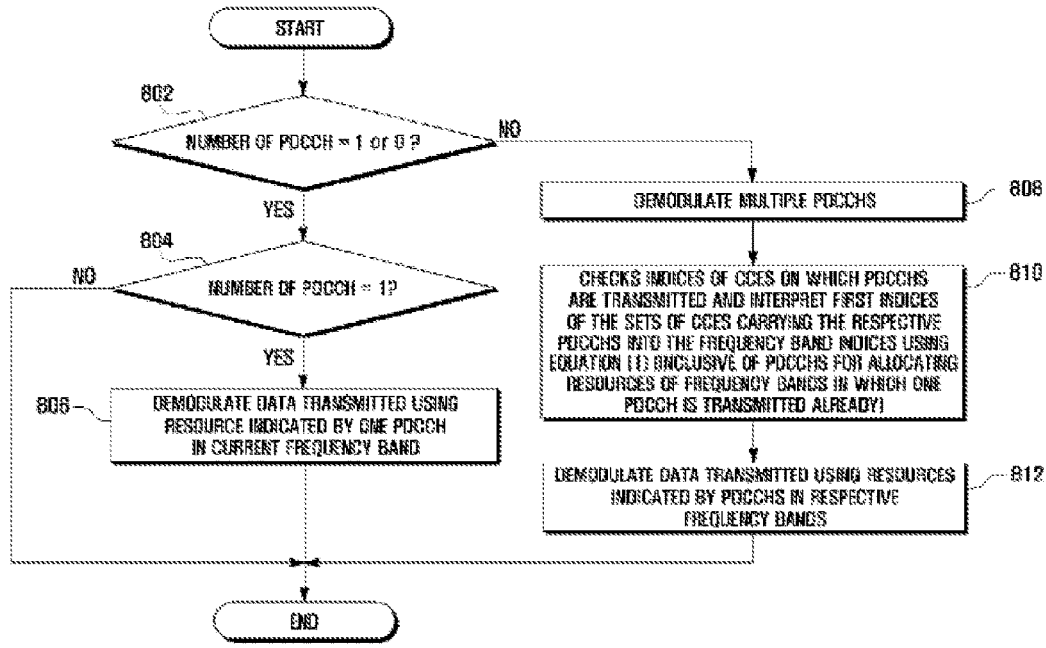
FIG. 16 is a flowchart illustrating a data reception method for an OFDMA-based communication system according to the second embodiment of the present invention.

FIG. 16 is a flowchart illustrating a data reception method for an OFDMA-based communication system according to the second embodiment of the present invention.

Referring to FIG. 16, when a physical control channel is received in a frequency band, the user equipment first determines whether a number of PDCCHs received in the current frequency band is equal to or less than one (802). If the number of PDCCHs received in the current frequency band is equal to or less than one, then the user equipment determines whether the number of PDCCHs received in the current frequency band is one (804). If the number of PDCCHs received in the current frequency band is not one (i.e. if no PDCCH is received), the user equipment terminates the PDCCH processing procedure. Otherwise, if the number of PDCCHs received in the current band is one, then the user equipment locates the resource indicated by the PDCCH in the current frequency band and demodulates the data transmitted using the resource (806) and terminates the PDCCH processing procedure. If the number of PDCCHs received in the current frequency band is not equal to or less than one (i.e. if multiple PDCCHs are received in the current frequency band) at step 802, then the user equipment demodulates the multiple PDCCHs (808). Next, the UE checks the indices of the CCEs on which the PDCCHs are transmitted and interprets the first indices of the sets of CCEs carrying the respective PDCCHs (including the PDCCHs for allocating the resource of a frequency band in which one PDCCH is transmitted already) into the frequency band indices by using equation (1) (810). Next, the user equipment locates the resources indicated by the PDCCHs in the respective frequency bands identified using the frequency band indices obtained by interpreting the CCE indices and demodulates the data transmitted using the resources located in the respective frequency band (812), and terminates the PDCCH processing procedure. It is noted that the frequency bands in which one PDCCH is transmitted are included as candidate frequency bands for locating resources at step 810. That is, the user equipment searches entire frequency bands, including those in which one PDCCH is transmitted, for the resources allocated.

In the data reception method according to the second embodiment of the present invention, the user equipment terminates the PDCCH processing procedure immediately when no PDCCH is received in the current frequency band; demodulates, when on e PDCCH is received in the current frequency band, the data transmitted in the resource indicated by the PDCCH within the current frequency band; and demodulates, when multiple PDCCHs are received in the current frequency band, the data transmitted in the resources indicated by the PDCCHs in the frequency bands identified using the frequency band indices obtained by interpreting the CCE indices by using the equation (1).

Figure 17:
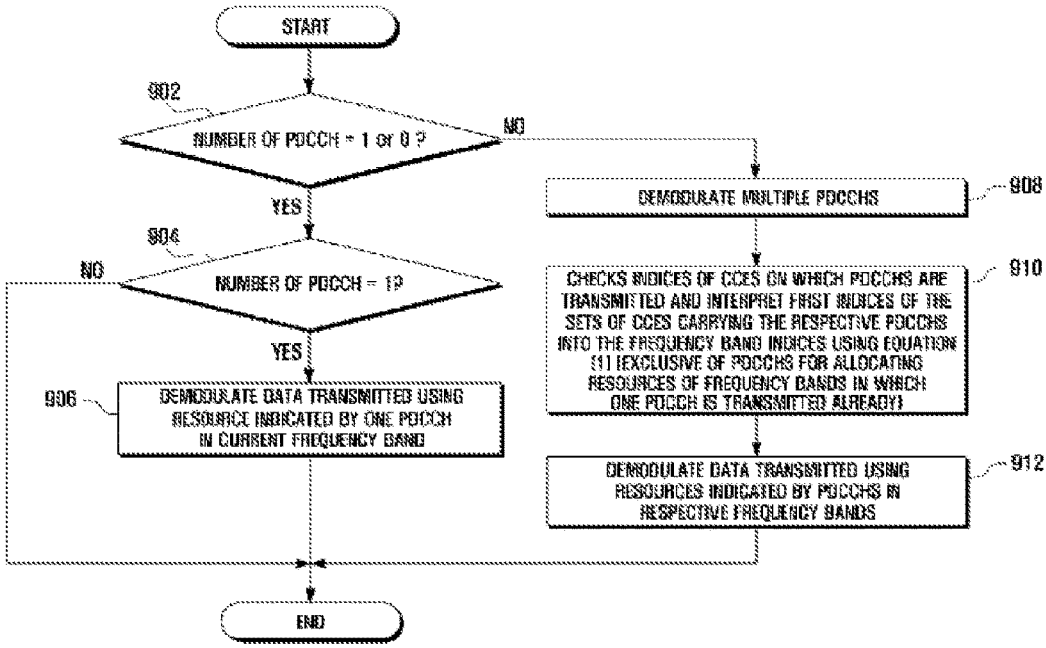
FIG. 17 is a flowchart illustrating a data reception method for an OFDMA-based communication system according to the third embodiment of the present invention.

FIG. 17 is a flowchart illustrating a data reception method for an OFDMA-based communication system according to the third embodiment of the present invention.

Referring to FIG. 17, when a physical control channel is received in a frequency band, the user equipment first determines whether a number of PDCCHs received in the current frequency band is equal to or less than one (902). If the number of PDCCHs received in the current frequency band is equal to or less than one, then the user equipment determines whether the number of PDCCHs received in the current frequency band is one (904). If the number of PDCCHs received in the current frequency band is not one (i.e. if n PDCCH is received), the user equipment terminates the PDCCH processing procedure. Otherwise, if the number of PDCCHs received in the current band is one, then the user equipment locates the resource indicated by the PDCCH in the current frequency band and demodulates the data transmitted using the resource (906) and terminates the PDCCH processing procedure. If the number of PDCCHs received in the current frequency band is not equal to or less than on (i.e. if multiple PDCCHs are received in the current frequency band) at step 902, then the user equipment demodulates the multiple PDCCHs (908). Next, the UE checks the indices of the CCEs on which the PDCCHs are transmitted and interprets the first indices of the sets of CCEs carrying the respective PDCCHs (excluding the PDCCHs for allocating the resource of a frequency band in which on PDCCH is transmitted already) into the frequency band indices by using equation (1). Next, the user equipment locates the resources indicated by the PDCCHs in the respective frequency bands identified using the frequency band indices obtained by interpreting the CCE indices using equation (1) and demodulates the data transmitted using the resources located in the respective frequency band on the basis of the PDCCHs (912), and terminates the PDCCH processing procedure. It is noted that the frequency bands in which one PDCCH is transmitted are excluded as candidate frequency bands for locating resources at step 910. That is, the user equipment searches the frequency bands, excluding those in which one PDCCH is transmitted, for the resources allocated.

In the data reception method according to the third embodiment of the present invention, the user equipment terminates the PDCCH processing procedure immediately when no PDCCH is received in the current frequency band; demodulates, when one PDCCH is received in the current frequency band, the data transmitted in the resource indicated by the PDCCH within the current frequency band; and demodulates, when multiple PDCCHs are received in the current frequency band, the data transmitted in the resources indicated by the PDCCHs in the frequency bands identified using the frequency band indices obtained by interpreting the CCE indices by using the equation (1).

Figure 18:
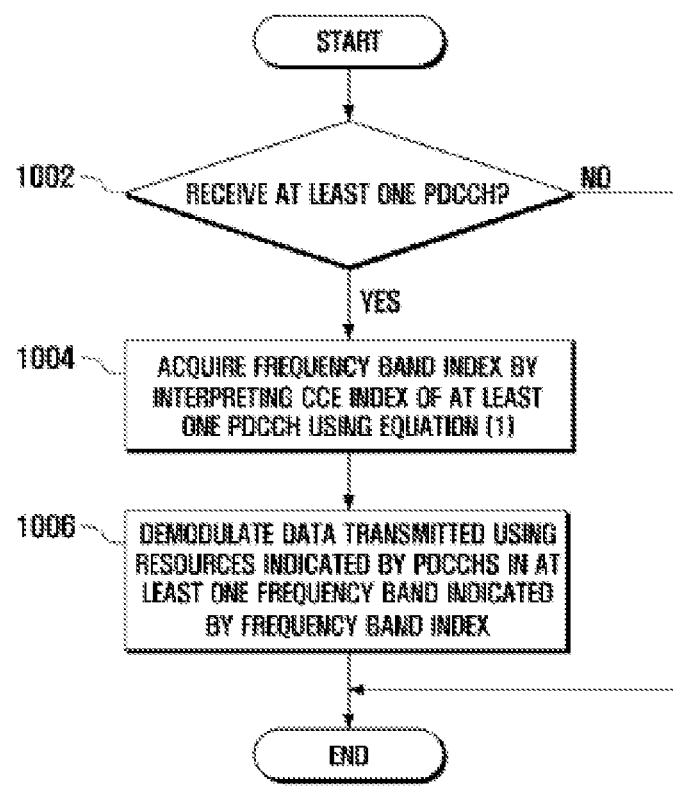
FIG. 18 is a flowchart illustrating a data reception method for an OFDMA-based communication system according to the fourth embodiment of the present invention.

FIG. 18 is a flowchart illustrating a data reception method for an OFDMA-based communication system according to the fourth embodiment of the present invention.

Referring to FIG. 18, when a physical control channel is received in a frequency band, the user equipment first determines whether at least one PDCCH is received in the current frequency band (1002). If no PDCCH is received, the user equipment terminates the PDCCH processing procedure immediately. Otherwise, if at least one PDCCH is received in the current frequency band, then the user equipment checks the CCE indices referencing the at least one PDCCHs and interprets the CCE indices into the frequency band indices by using equation (1) (1004). Next, the user equipment demodulates the data transmitted using the resources located in the at least one frequency band on the basis of the PDCCHs (1006) and terminates the PDCCH processing procedure.

In the data processing method according to the fourth embodiment of the present invention, the user equipment first checks the number of PDCCHs received in the current frequency band, acquires, when at least one PDCCH is received in the current frequency band, the frequency band indices by interpreting the indices of the CCEs on which the PDCCHs are transmitted using equation (1), and demodulates the data transmitted using the resources located with reference to the PDCCHs.

As described above, the resource allocation method for OFDMA-based communication system according to an exemplary embodiment of the present invention is advantageous to allocate resources of different frequency bands by transmitting multiple PDCCHs through a control channel of one of the frequency bands without increasing control information overhead. In an OFDMA-based communication system according to an exemplary embodiment of the present invention, the base station transmits the multiple PDCCHs having implicit CCE indices through a control channel of one of the frequency bands, and the user equipment interpret the CCE indices into frequency band indices and locates the resources allocated in the different frequency bands using the PDCCHs of the frequency bands indicated by the frequency band indices.

While certain embodiments of the present invention have been illustrated and described, it will be clear that the present invention and its advantages are not limited to these embodiments only. Numerous modifications, changes, variations, substitutions and equivalents will be apparent to those skilled in the art without departing from the spirit and scope of the present invention as described in the claims.

What is claimed:

1. A method for transmitting a physical downlink control channel (PDCCH) by a base station in a wireless communication system, the method comprising:
    acquiring downlink control information corresponding to a first carrier among a plurality of carriers;
    identifying a control channel element (CCE) index based on an index of the first carrier; and
    transmitting the downlink control information based on the CCE index on a determined carrier among the plurality of carriers.

2. The method of claim 1, wherein the CCE index identified based on an index of the first carrier is located on a user equipment dedicated region in a control region that comprises a common region and the user equipment dedicated region.

3. The method of claim 1, wherein the CCE index is identified by an order of an index of the carriers.

4. The method of claim 1, wherein a PDCCH for a second carrier among the plurality of carriers is transmitted on the second carrier.

5. The method of claim 1, wherein a PDCCH for a third carrier among the plurality of carriers is transmitted on only the determined carrier.

6. A method for receiving a physical downlink control channel (PDCCH) by a user equipment in a wireless communication system, the method comprising:
identifying a control channel element (CCE) index based on an index of a first carrier among a plurality of carriers;
receiving downlink control information corresponding to the first carrier based on the identified CCE index on a determined carrier that is one carrier among the plurality of carriers; and
receiving data by the downlink control information.

7. The method of claim 6, wherein the CCE index identified based on an index of the first carrier is located on a user equipment dedicated region in a control region that comprises a common region and the user equipment dedicated region.

8. The method of claim 6, wherein the CCE index is identified by an order of an index of the carriers.

9. The method of claim 6, wherein a PDCCH for a second carrier among the plurality of carriers is transmitted on the second carrier.

10. The method of claim 6, wherein a PDCCH for a third carrier among the plurality of carriers is transmitted on only the determined carrier.

11. A base station for transmitting a physical downlink control channel (PDCCH) in a wireless communication system, the base station comprising:
a transceiver; and
a controller configured to:
acquire downlink control information corresponding to a first carrier among a plurality of carriers,
identify a control channel element (CCE) index based on an index of the first carrier, and
control the transceiver to transmit the downlink control information based on the CCE index on a determined carrier among the plurality of carriers.

12. The base station of claim 11, wherein the CCE index identified based on an index of the first carrier is located on a user equipment dedicated region in a control region that comprises a common region and the user equipment dedicated region.

13. The base station of claim 11, wherein the CCE index is identified by an order of an index of the carriers.

14. The base station of claim 11, wherein a PDCCH for a second carrier among the plurality of carriers is transmitted on the second carrier.

15. The base station of claim 11, wherein a PDCCH for a third carrier among the plurality of carriers is transmitted on only the determined carrier.

16. A user equipment for receiving a physical downlink control channel (PDCCH) in a wireless communication system, the user equipment comprising:
a transceiver; and
a controller configured to:
identify a control channel element (CCE) index based on an index of a first carrier among a plurality of carriers,
control the transceiver to receive downlink control information corresponding to the first carrier based on the identified CCE index on a determined carrier that is one carrier among the plurality of carriers, and
control the transceiver to receive data by the downlink control information.

17. The user equipment of claim 16, wherein the CCE index identified based on an index of the first carrier is located on a user equipment dedicated region in a control region that comprises a common region and the user equipment dedicated region.

18. The user equipment of claim 16, wherein the CCE index is identified by an order of an index of the carriers.

19. The user equipment of claim 16, wherein a PDCCH for a second carrier among the plurality of carriers is transmitted on the second carrier.

20. The user equipment of claim 16, wherein a PDCCH for a third carrier among the plurality of carriers is transmitted on only the determined carrier.

* * * * *